C. BUSS.
CAR DOOR.
APPLICATION FILED JUNE 28, 1909.
955,757.
Patented Apr. 19, 1910.
2 SHEETS—SHEET 1.
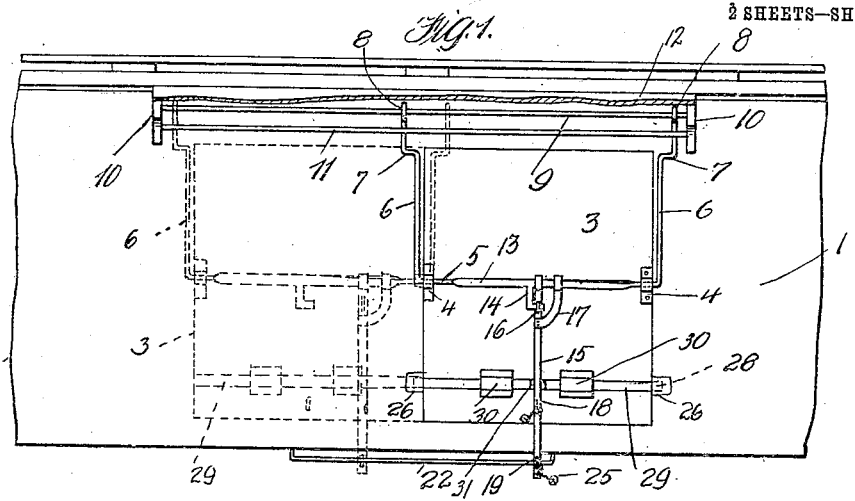
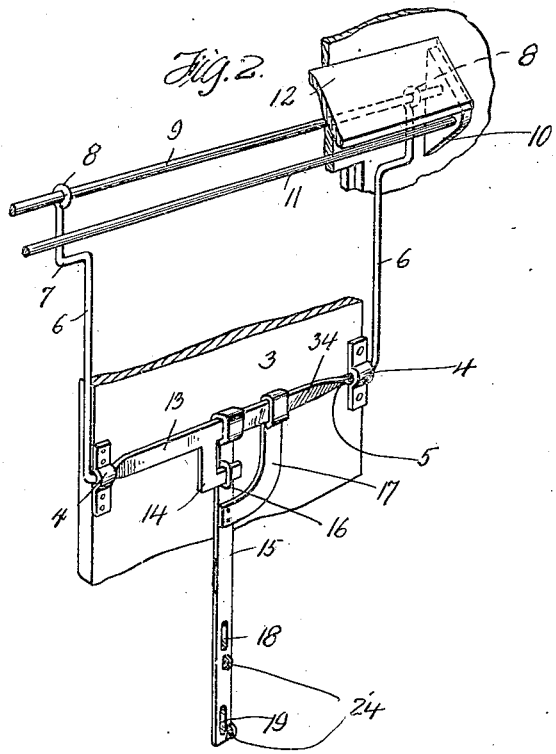
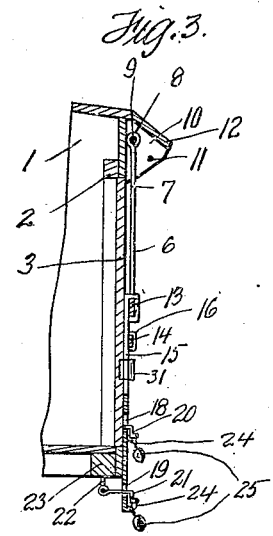
Witnesses
Samuel Payne
K. H. Butler
Inventor
Charles Buss
By H. C. Everitt & Co.
Attorneys.

C. BUSS.
CAR DOOR.
APPLICATION FILED JUNE 28, 1909.
955,757.
Patented Apr. 19, 1910.
2 SHEETS—SHEET 2.
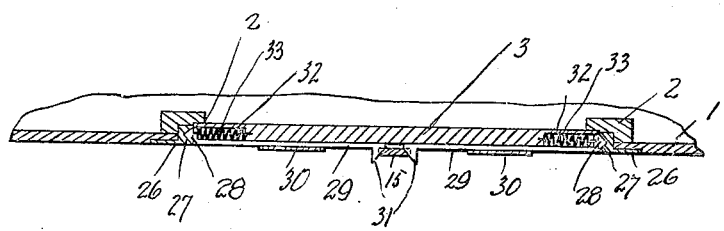
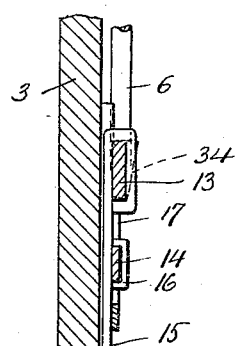
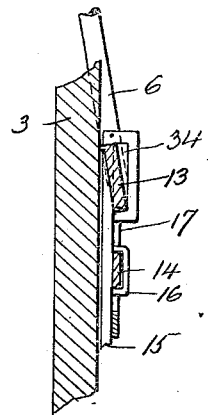
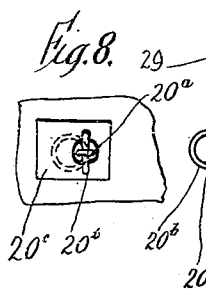
Inventor
Charles Buss.
Witnesses
Samuel Payne
R. H. Butler
By H C Everitt
Attorney

UNITED STATES PATENT OFFICE.

CHARLES BUSS, OF GLENWILLARD, PENNSYLVANIA.

CAR-DOOR.

955,757. Specification of Letters Patent. Patented Apr. 19, 1910.

Application filed June 28, 1909. Serial No. 504,748.

*To all whom it may concern:*

Be it known that I, CHARLES BUSS, a citizen of the United States of America, residing at Glenwillard, in the county of Allegheny and State of Pennsylvania, have invented certain new and useful Improvements in Car-Doors, of which the following is a specification, reference being had therein to the accompanying drawing.

This invention relates to car doors, and more particularly to doors used in connection with refrigerator cars and freight cars.

The invention has for its primary object to provide a novel means for shifting a door, whereby the same can be bodily removed from the doorway of the car to permit of easy access being had to the interior of the car.

Another object of the invention is to provide a novel fastening means for a car door, to permit of the car door being secured either in a closed or open position.

A still further object of this invention is to obviate the necessity of using hangers and wheels for movably suspending a car door from a rail located above the doorway of a car, such construction often permitting of the car door swinging outwardly and becoming injured when a train is in motion. I obviate such defect by a car door that will be normally maintained and fastened in an open or closed position.

With the above and other objects in view which will more readily appear as the invention is better understood the same consists in the novel construction, combination and arrangement of parts to be hereinafter described and then claimed.

In the drawings:—Figure 1 is a front elevation of a portion of a car equipped with my improved car door, Fig. 2 is a perspective view of a portion of the car door and operating mechanism thereof, Fig. 3 is a vertical sectional view of a portion of the car and car door constructed in accordance with my invention, Fig. 4 is a horizontal sectional view of a lock used in connection with the car door, Fig. 5 is an enlarged vertical sectional view of a portion of the car door, showing the locking bar thereof in a closed position, Fig. 6 is a similar view showing a portion of the door, and the position the hangers assume when the door is swung away from the doorway, Fig. 7 is a horizontal sectional view of the door hangers illustrating the connecting bar, and Fig. 8 is an elevation of a portion of the inner side of the car door.

In the drawings, 1 denotes a portion of a car having a side doorway 2 adapted to be closed by a door 3. This door and doorway can be stepped similar to the door and doorway of a refrigerator car, or the door made to snugly fit in an ordinary doorway, as shown in Fig. 3 of the drawings. The outer vertical sides of the door 3 are provided with bearings 4 for a connecting bar 5 having the ends thereof formed integral with hangers 6, said hangers being offset, as at 7, and provided with loops 8. These loops are loosely mounted upon a hanger rod 9 mounted in brackets 10, carried by the outer side of the car 1 adjacent to the edge of the roof of the car. The brackets 10 also support a guard rod 11 and a shield 12, said shield protecting the rods 9 and 11 from rain and such matter that would cause the rods to corrode or deteriorate. The guard rod 11 prevents the hanger 6 from swinging outwardly more than the prescribed distance for moving the door 3.

The connecting bar 5 is made rectangular and twisted for a portion of its length, as at 13, and is provided with a depending L-shaped member 14. Slidably mounted upon the rectangular portion of the bar 5 is a vertical locking bar 15 provided adjacent to its upper end with a staple 16 to receive an L-shaped member 14, to insure a positive connection with the door 3 when the same is to be opened or closed. The locking bar adjacent to the staple is also provided with a curved member 17 engaging the connecting bar 5 and secured to the bar 15, but in some instances this curved member can be dispensed with, particularly on light weight doors. The lower end of the locking bar 15 is provided with two elongated openings or slots 18 and 19, the former receiving a staple 20, while the latter receives a staple 21 loosely mounted upon a rectangular yoke 22, carried by one of the longitudinal beams 23 of the car. The staple 20 is carried by a rod 20$^a$, extending through the door 3 and having the inner end thereof provided with a ring or handle 20$^b$. This ring or handle 20$^b$ is adapted to fit in a pocket 20$^c$ formed in the door 3, and not interfere with matter placed in the car.

The locking bar 15 adjacent to the openings 18 and 19 is provided with apertured lugs 24, and these lugs can be connected to the staples 20 and 21 by seals or padlocks 25. With the seals or padlocks removed, the door 3 can be opened from the inner side of the door by pulling upon the ring or handle 20$^b$, and removing the staple 20 from the opening or slot 18. The door can then be pushed outwardly and moved to one side.

The doorway 2 has the side frames 26 thereof provided with V-shaped pockets 27 to receive the V-shaped ends 28 of latches 29, comprising the door fastener. These latches are oppositely disposed in brackets 30, carried by the door 3, contiguous to the lower edge thereof, and the confronting ends of said latches are provided with beveled enlargements 31 adapted to be engaged by the locking bar 15 for locking the latches in a closed position. For retaining the latches in engagement with the door-frame irrespective of the locking bar 15, the edges of the door 3 are recessed, as at 32 for coil springs 33, and these springs are adapted to bear against the V-shaped ends 28 of the latches and normally maintain said ends in the pockets 27.

The manner of shifting the door 3 is as follows: With the lower end of the locking bar 15 released, said bar is swung outwardly until the door 3 clears the doorway 2, and then the bar 15 is moved to the left to position the door 3 as shown in dotted lines in Fig. 1. If it were not for the twisted portion 34 of the connecting bar 13, the locking bar 15 would stand outwardly at an angle to the door when said door is in an open position, and in order that the locking bar can be swung against the door, said bar is shifted to the twisted portion 34 of the connecting bar, and lies against the door as shown in Fig. 6. It can be locked in this position by shifting the staple 21, and connecting said staple to the lower end of the locking bar 15 by a seal or padlock. The members 14 and 17 prevent the locking bar 15 from wabbling or swinging when the same is free or is being manipulated to open or close the door.

While in the drawings there is illustrated a preferred embodiment of the invention, it is to be understood that the structural elements thereof can be varied or changed as to the size, shape and manner of assemblage without departing from the spirit of the invention.

Having now described my invention what I claim as new, is:—

1. The combination with a car having a doorway formed therein, and a door adapted to close said doorway, of hangers movably supporting said door, a bar connecting said hangers, latches carried by said door for engaging said car, a locking bar movably mounted upon said connecting bar and adapted to fit between said latches to retain the same in a closed position, and means for attaching said locking bar to said door and to said car.

2. The combination with a car having a doorway formed therein, and a door adapted to fit in said doorway, of bearings carried by the outer side of said door, a connecting bar loosely mounted in said bearings, hangers connecting with said bar, a hanger rod carried by said car for supporting said hangers, a guard rod carried by said car for limiting an outward movement of said hangers, spring pressed latches carried by said door and adapted to engage said car, a locking bar movably mounted upon said connecting bar and adapted to fit between said latches, and means for attaching said locking bar to said door and to said car.

3. The combination with a car having a doorway formed therein, and a door adapted to fit in said doorway, of bearings carried by the outer side of said door, a connecting bar loosely mounted in said bearings, hangers connecting with said bar, a hanger rod carried by said car for supporting said hangers, a guard rod carried by said car for limiting an outward movement of said hangers, spring pressed latches carried by said door and adapted to engage said car, a locking bar movably mounted upon said connecting bar and adapted to fit between said latches, members movably connecting said locking bar with said connecting bar, and means for attaching said locking bar to said door and to said car.

In testimony whereof I affix my signature in the presence of two witnesses.

CHARLES BUSS.

Witnesses:
MAX H. SROLOVITZ,
A. J. TRIGG.